T. H. Müller,

Making Lead Pencils.

No. 110,777.   Patented Jan. 3, 1871.

2 Sheets. Sheet 1.

WITNESSES.

T. H. Müller,
Making Lead Pencils.
No. 110,777. Patented Jan. 3, 1871.

United States Patent Office.

TEILE H. MÜLLER, OF NEW YORK, N. Y., ASSIGNOR TO JOSEPH RECKENDORFER, OF SAME PLACE.

Letters Patent No. 110,777, dated January 3, 1871.

IMPROVEMENT IN MACHINES FOR CUTTING THE ENDS OF WOODEN PENCILS,

The Schedule referred to in these Letters Patent and making part of the same.

*To whom it may concern:*

Be it known that I, TEILE H. MÜLLER, of the city, county, and State of New York, have invented certain new and useful Improvements in Machinery for Cutting and Finishing the Ends of Wooden Pencils and other articles, of which the following is a specification.

My invention relates to machines for cutting and smoothing the ends of wooden pencils, ordinarily known as "pencil-heading" machines.

The machine in which my invention is embodied comprises a rotary circular plane-surfaced knife, which has a reciprocating motion to and from the end of the pencil to be cut, and at right angles with the axis of the same.

With the reciprocating blade is combined a feed-block, in which the pencils are placed one after the other, so as to be cut by the blade as it moves back and forth.

The rotary and reciprocating movements of the blade bear such relation to each other that, at each reciprocation of the blade, a fresh portion of its cutting edge is brought in contact with the pencil, thus avoiding liability of dulling the edge, which would occur were the same portion of the blade invariably used to cut the pencils.

The shaft of the blade is also set at an angle to and not parallel with the axis of the pencils, so that only the forward part of the blade will be brought in contact with the pencil, thus avoiding the smearing of the pencil end, and allowing the blade to clear itself.

I also combine with the blade a grinding mechanism, which keeps the edge sharp and free from the particles of lead which might otherwise adhere to it. This grinding mechanism is also made adjustable longitudinally, whereby it may be caused to alter the character of the edge of the blade in accordance with the nature of the wood to be cut.

In this machine the pencils are fed by hand to the cutting apparatus, thus avoiding the difficulties which have been experienced in providing an automatic feed for pencil-heading machines, and the great expense attending the same.

To enable those skilled in the art to understand and use my invention, I will now proceed to describe the manner in which the same is or may be carried into effect by reference to the accompanying drawing, in which—

The working parts of the machine are supported by a frame and bed, A, of any suitable construction.

The reciprocating cutter carriage B moves on dovetailed ways attached to the bed, and receives motion from the crank or eccentric shaft C through the connecting-rod $a$.

At one side of the carriage the feed-block D which holds the pencils is placed in such position that its face or front end will be parallel with the line of movement of the carriage.

The pencil end projects beyond the face of this block, and is cut by the revolving circular plane-surfaced blade E, the edge of which moves in or nearly in contact with the steel face of the feed-block.

The general arrangement of these devices being thus indicated, I will proceed to describe in detail the several parts of the apparatus.

First, the feed-block.

Figure 2:
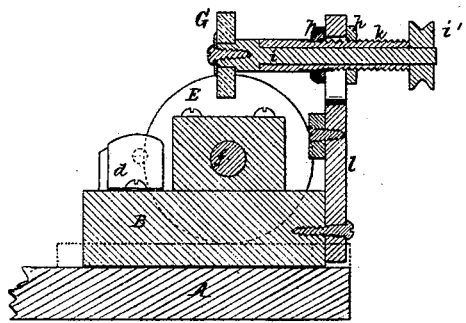
Figure 2 is a longitudinal vertical section through the reciprocating carriage, the grinding-wheel shaft, and its vibratory supporting arm or lever.
Figure 3:
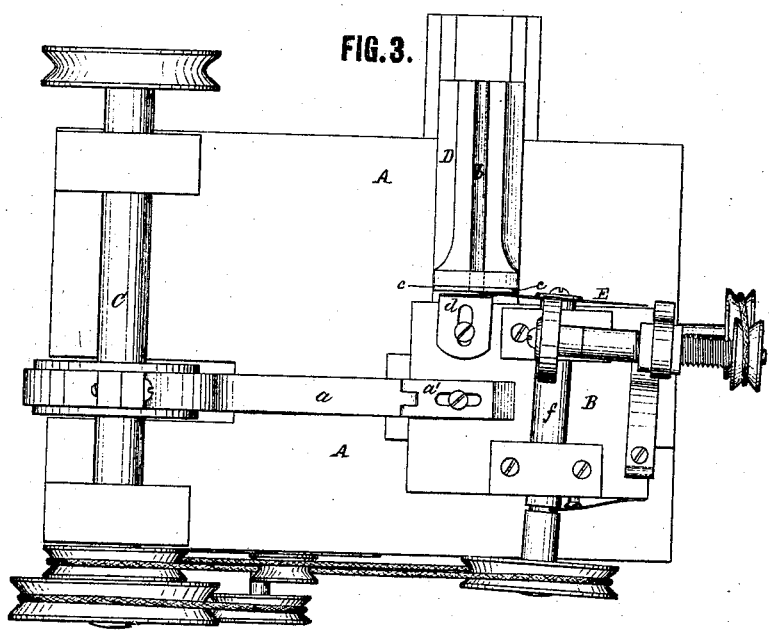
Figure 3 is a plan view of the machine.
Figure 4:
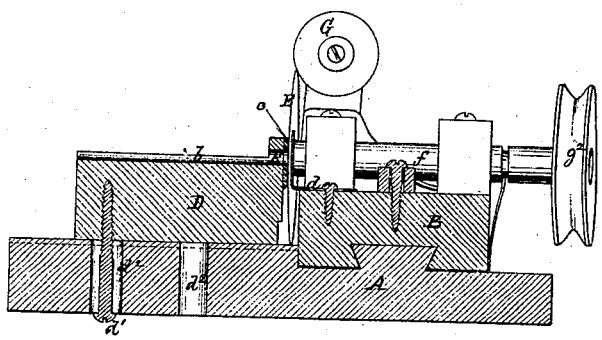
Figure 4 is a transverse section of the machine, through the feed-block and reciprocating carriage.

This feed-block D is shown plainly in figs. 2 and 3. It is composed of a block of any suitable size and material, in which is formed a groove or trough, $b$, for the reception of the pencil. This groove or trough may be partly open for a portion of its length, but at or near the front end of the block it is inclosed so as to form a tubular passage, $b'$.

The face of the block around this tubular opening is made of steel, as shown at $c$, so that it may act in conjunction with the cutting-blade to properly cut and finish the pencil end.

The pencil to be operated on is placed in the trough and pushed forward by hand until its end passes through the opening $b'$ and strikes against the gauge $d$. This gauge is fastened to the reciprocating carriage in front of the cutting-blade, and the pencil, of course, can only be pushed forward against the gauge when the reciprocating carriage has moved back sufficiently to draw back the blade from over the opening $b$; the pencil is then forced forward until it bears against the gauge, and then the carriage, in its return movement, brings back the revolving cutter, whose edge is in contact or nearly so with the steel face of the feed-block, and, consequently, cuts from the pencil end a shaving, whose thickness is determined by the distance at which the gauge $d$ is set from the face of the feed-block.

The feed-block slides, on suitable ways, toward or away from the cutter, and, by means of the set-screw $d^1$ passing through the slot $d^2$, can be adjusted accurately, so as to keep its steel face in proper proximity to the cutting-blade, notwithstanding any wear of the latter.

As I have before stated, the pencils are fed to the cutter by hand, being one after the other placed in the trough, pushed up against the gauge, and then withdrawn from the block, after having been "headed," as will be understood without further explanation.

Second, the revolving cutter.

Figure 1:
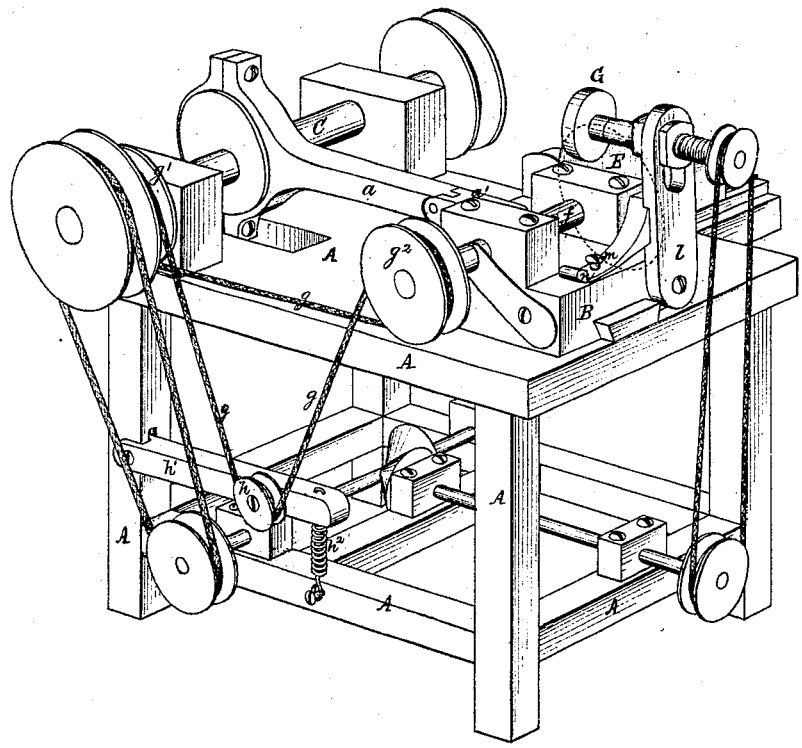
Figure 1 is a perspective view of a pencil-heading machine made in accordance with my invention.

The cutter consists of a circular plane-surfaced blade, E, the arrangement and mode of operation of which will be understood by reference to figs. 1 and 3.

As indicated in fig. 3, the axis or shaft $f$ of the blade is not parallel with the axis of the pencil placed in the trough $b$, but is set at an angle thereto, so that the front edge of the circular blade will alone be in contact with the steel face of the block D, this being necessary in order to make a clean cut and allow the blade to clear itself.

The shaft of the cutter-blade is mounted, at the inclination above named, in bearings or boxes on the reciprocating carriage B, which moves, as above stated, in parallelism with the face of the feed-block.

The reciprocations of the carriage are imparted from the crank or eccentric shaft C through the medium of the connecting-rod $a$, which can be lengthened or shortened at pleasure by means of the hinged piece $a^1$ through a longitudinal slot, in which a set-screw, $a^2$, passes down into the carriage. By moving this piece in one direction or the other the arm $a$ can be lengthened or shortened, and the position of the carriage can be correspondingly changed, so as to compensate for any wear in the blade. If, for instance, the blade should become worn so that the reciprocations of the carriage would not be sufficient to carry it through the pencil, in such case the set-screw $a^2$ is loosened, the carriage drawn toward the shaft G so as to shorten the rod $a$, and the screw is again made tight. This movement of the carriage bodily toward the shaft compensates for the wear in the blade, and allows the latter to again cut entirely through the pencil. The same result may be accomplished by dispensing with the adjustable connection between the shaft and carriage and mounting the shaft in bearings or boxes longitudinally adjustable upon the bed of the machine. By varying the position of the boxes and shaft the position of the carriage would be correspondingly varied.

The cutter-blade is kept continuously revolving during the reciprocations of the carriage by means of belting $g$, which passes around through three pulleys, $g^1\ g^2\ h$, in the manner shown in the drawing.

The pulley $g^1$ is on the driving or eccentric shaft C, and the pulley $g^2$ on the cutter-shaft $f$. If the belting were carried directly from one pulley to the other it would be slack at one time and tight at another owing to the reciprocations of the carriage, and to obviate this difficulty I employ the intermediate pulley $h$, located at the apex of a triangle, of which the two pulleys $g^1\ g^2$ are the base.

This pulley is mounted on a vibrating arm or lever, $h^1$, which is held away from the other two pulleys with a yielding pressure, by means of a spring, $h^2$, weight, or equivalent device for the purpose, so that the slack will be taken up and an even tension of the belt will be maintained at all times during the reciprocations of the carriage.

I am aware that it is not new to employ a tightening device for the purpose of taking up the slack of belting, but I have discovered that, by increasing the distance of the intermediate pulley from the others, so as to render the angle at the apex of the triangle formed by them acute, the movement of the intermediate pulley, for the purpose of taking up the slack, is very slight, and much less than it would be were it arranged nearly in line with the two main pulleys, as is ordinarily the case. Indeed, if the reciprocations of the carriage are at all extended, the movements of the tightening pulley, when arranged as last referred to, for the purpose of taking up the slack, would necessarily be so great as to render its use practically impossible. Under the arrangement shown by me, however, the carriage may have an extended movement without causing more than a slight up-and-down motion to the intermediate pulley. This pulley is represented as being arranged beneath the two main pulleys, but it may also be placed above them and at a greater distance than shown.

If the pulleys $g^1$ and $g^2$ were of the same size, the crank-shaft C would complete one revolution, and, consequently, the carriage B would make one reciprocation during the same time in which the cutter E would make one revolution; consequently, the same portion of the cutting-blade would each time be brought in contact with the pencil, while the other portions would do little or no work. To remove this difficulty I make the two pulleys of different sizes, so that the two shafts shall revolve at different rates of speed.

In the drawing the pulley $g^2$ is represented as slightly larger than the pulley $g^1$, so that, while the latter is making one revolution, the former will make, say, six-sevenths of a complete revolution.

When, therefore, any one portion of the blade has cut a pencil, six other pencils will be cut before that portion of the blade is again called upon to do any work. The pulley $g^2$ may revolve faster than the pulley $g^1$, and the ratio between the two is, to a great extent, optional. In this way the blade is much more evenly worn, and the wear and tear of the machine is greatly reduced.

Third, the grinding apparatus.

The grinding apparatus consists of a grinding-wheel, G, mounted upon a horizontal spindle or shaft, $i$, which revolves in a stationary sleeve, $k$, and receives motion from the pulley $i'$ on its rear end, which communicates through suitable gearing with the driving-shaft C, as shown in fig. 1.

The sleeve $k$ is supported by an arm or lever, $l$, pivoted to the carriage B, so that it may be moved toward or away from the cutter E, and thus allow the grinding-wheel to be adjusted in proper relation to the blade.

The grinding-wheel should press against the blade with just sufficient force to keep the latter sharp, and this pressure is regulated by the adjusting-screw $m$ which passes through the spring arm $n$ attached to the lever $l$. The spring arm serves to press the wheel against the blade with a yielding pressure.

The sleeve $k$ passes through a vertical slot in the lever $l$, and is adjusted up and down therein by means of the holding or clamp-nuts $p\ p$, which engage with a screw-thread cut upon the exterior of the sleeve, as plainly shown in fig. 2. By reason of this arrangement of the screw-thread and holding-nuts the sleeve is capable of being adjusted longitudinally, so as to bring the grinding-wheel in contact with the blade in or on either side of a vertical plane passing through the axis of the blade. This feature is one of some importance, since the grinding-wheel in different locations gives a different character to the edge to the blade.

To the naked eye the edge of the blade, no matter where the grinding-wheel is located, appears as fine and keen as that of a razor. But, when put under a microscope, it presents a serrated appearance like a saw.

These saw-teeth are formed by the grinding-wheel, and, in form and appearance, vary according as the wheel is placed in front or in rear of the vertical plane which passes through the axis of the blade. In some cases it is preferable to set the grinding-wheel in one position; in other cases in another, this being determined by the texture of the wood and the degree of hardness of the lead of the pencil, and I, therefore, form the screw-thread upon the exterior of the sleeve, and provide the same with holding-nuts, which will clamp the lever *l* between them, so that the grinding-wheel shaft may be moved longitudinally in either direction, as required.

The grinding apparatus follows the reciprocating movement of the carriage to which it is attached, but this movement is not great enough to interfere with a proper transmission of motion to the grinding-wheel from the belting which imparts to it its rotary movement.

Having now described my invention and the manner in which the same is or may be carried into effect, what I claim, and desire to secure by Letters Patent, is—

1. The combination, with the pencil-feed block, of the reciprocating carriage moving parallel with the face of the feed-block, and the revolving cutter mounted on said carriage and set at an angle with the face of the feed-block, substantially in the manner and for the purposes shown and described.

2. The combination, with the pencil-feed block, the reciprocating carriage, the driving or eccentric shaft from which said carriage derives its movement, and the revolving cutter and cutter-shaft, of the pulleys on said eccentric and cutter-shaft, constructed of different sizes, so that the eccentric shaft may revolve at a different rate of speed from that of the cutter-shaft, as and for the purposes shown and described.

3. The herein-described combination, with the pencil-feed block, of the cutter-carriage and mechanism for imparting to the same a vibratory movement, arranged so that the position of the carriage, with relation to the feed-block, may be varied to compensate for the wear of the cutter, as set forth.

4. The adjustable pencil-feed block, constructed substantially as herein described; that is to say, having a trough for the body of the pencil, a tubular opening for the end of the pencil, and a steel face, as and for the purposes set forth.

5. The combination, with the reciprocating cutter-carriage and pencil-feed block, of the gauge attached to said carriage in front of the cutting-blade, and arranged with relation to the feed-block so as to determine the extent to which the end of the pencil shall project therefrom, substantially as herein shown and set forth.

6. The combination, with the circular revolving cutter and the reciprocating carriage, of an emery or grinding-wheel moving the said carriage, and mounted upon a horizontal shaft placed transversely to the cutter-shaft and adjustable longitudinally, substantially in the manner and for the purposes shown and described.

7. The combination, with the cutter-carriage and cutter, of the grinding-wheel, the adjustable lever or arm for supporting the same, as described, and the spring for upholding the said wheel with a yielding pressure against the cutter, as herein shown and set forth.

In testimony whereof I have signed my name to this specification before two subscribing witnesses.

TEILE H. MÜLLER.

Witnesses:
J. F. WILLIAMS,
H. C. BENSON.